(12) United States Patent
Binzer et al.

(10) Patent No.: US 9,488,718 B2
(45) Date of Patent: Nov. 8, 2016

(54) ANGLE-RESOLVING RADAR SENSOR FOR MOTOR VEHICLES

(75) Inventors: Thomas Binzer, Ingersheim (DE);
Christian Waldschmidt, Renningen (DE); Volker Gross, Ditzingen (DE);
Raphael Hellinger, Pforzheim (DE);
Goetz Kuehnle, Hemmingen (DE);
Andre Treptow, Vaihingen an der Enz (DE)

(73) Assignee: ROBERT BOSCH GMBH, Stuttgart (DE)

(*) Notice: Subject to any disclaimer, the term of this patent is extended or adjusted under 35 U.S.C. 154(b) by 341 days.

(21) Appl. No.: 14/232,087

(22) PCT Filed: May 16, 2012

(86) PCT No.: PCT/EP2012/059190
§ 371 (c)(1),
(2), (4) Date: Apr. 22, 2014

(87) PCT Pub. No.: WO2013/007431
PCT Pub. Date: Jan. 17, 2013

(65) Prior Publication Data
US 2014/0225766 A1    Aug. 14, 2014

(30) Foreign Application Priority Data
Jul. 12, 2011 (DE) .................. 10 2011 079 007

(51) Int. Cl.
*G01S 7/02* (2006.01)
*G01S 13/93* (2006.01)

(52) U.S. Cl.
CPC ............... *G01S 7/02* (2013.01); *G01S 13/931* (2013.01); *G01S 2013/9321* (2013.01)

(58) Field of Classification Search
CPC ............... G01S 13/931; G01S 2013/9321; G01S 7/02
USPC .................................................. 342/147
See application file for complete search history.

(56) References Cited

U.S. PATENT DOCUMENTS

| 3,364,490 A | | 1/1968 | Hannan | |
| 4,023,172 A | * | 5/1977 | Schmidt | G01S 3/32 342/149 |
| 5,977,904 A | * | 11/1999 | Mizuno | G01S 13/422 342/70 |
| 6,674,394 B1 | | 1/2004 | Zoratti | |

FOREIGN PATENT DOCUMENTS

| DE | 100 36 131 | 2/2002 | |
| DE | 10 2010 041438 | 3/2012 | |
| IT | EP 0683541 A1 * | 11/1995 | ............... H01Q 3/26 |

* cited by examiner

*Primary Examiner* — Timothy A Brainard
(74) *Attorney, Agent, or Firm* — Norton Rose Fulbright US LLP; Gerard Messina

(57) ABSTRACT

An angle-resolving radar sensor for motor vehicles having multiple antenna elements and multiple receive channels, at least two antenna elements connected to the same receive channel together having a directional characteristic having at least two main lobes having different primary sensitivity directions.

11 Claims, 3 Drawing Sheets

ANGLE-RESOLVING RADAR SENSOR FOR MOTOR VEHICLES

FIELD OF THE INVENTION

The present invention relates to an angle-resolving radar sensor for motor vehicles having multiple antenna elements and multiple receive channels.

BACKGROUND INFORMATION

Motor vehicles are increasingly equipped with so-called ACC (adaptive cruise control) systems which allow the distance between the host vehicle and a preceding vehicle to be automatically controlled. For this purpose, the distances and azimuths as well as relative velocities of preceding vehicles are measured with the aid of the radar sensor, e.g., an FMCW LRR (frequency-modulated continuous wave long-range radar) sensor. These radar sensors typically work with a frequency of 24 GHz or 77 GHz.

Lens antennas are, for example, used in the case of long-range radar (LRR) sensors for motor vehicles. These include a radar lens and multiple antenna elements which are also referred to as primary radiators. The primary radiators are, for example, configured as patch antennas. To obtain an angular misalignment of the primary sensitivity directions of the patch antennas, the primary radiators are situated in a series transversely to the optical axis of the radar sensor. If, as is often the case, the same antenna elements are used to emit the radar signal and to receive the radar echo, the primary radiation directions of the antenna elements also have corresponding deviations. The greater the distance a primary radiator is from the optical axis of the radar lens, the stronger does the primary radiation direction of the antenna element in question deviate from the optical axis. This deviation is also referred to as squinting. When specifying the widths of the sensitivity ranges of the antenna elements, a compromise must be made between a wide range of vision and a good angle resolution.

The radar sensors used so far in this context have four antenna elements or antenna patches, for example. Each antenna element is assigned exactly one channel of an evaluation device of the radar sensor. The antenna elements each have a directional characteristic having a main lobe, i.e., a limited range of high sensitivity which includes a sensitivity maximum. The main lobes of the antenna elements together cover a certain angle range. Since the sensitivity ranges overlap, radar echoes from a single radar object are received in multiple antenna elements and thus in multiple channels. For an idealized, approximately punctiform radar object at a given azimuth, there is a characteristic phase-amplitude relation between the signals received in the different channels. Due to the propagation differences of the radar echoes from the radar object to the different antenna elements, a phase difference results which is approximately proportional to the azimuth with regard to an optical axis of the radar sensor and proportional to the distance between the antenna elements in the direction which is at a right angle to the optical axis, as well as inversely proportional to the wave length of the radar waves. The amplitude ratios between the received signals are a function of the azimuth and of the sensitivity curves of the antenna elements. By evaluating the phase relations and/or by evaluating the amplitude relations, it is possible to determine the azimuth of a located radar object.

The signal received by an assigned antenna element is evaluated in the channels of the radar sensor. In an FMCW radar, for example, in which the frequency of the transmitted radar signal is modulated periodically, the received signal is mixed for each antenna element with the signal transmitted at the receiving point in time, by maintaining the phase and amplitude relations, so that an intermediate frequency signal is obtained whose frequency corresponds to the frequency difference between the transmitted and the received signal. The intermediate frequency signals may be evaluated in an electronic evaluation device. For example, they may be digitized using analog/digital converters and then further processed digitally. For example, a frequency spectrum of the intermediate frequency signal is recorded in every channel of the evaluation device during each measurement period. In this frequency spectrum, each located object is indicated by a peak whose frequency range is a function of the distance and the relative velocity of the object in question. By modulating the transmitted frequency using different ramp gradients, it is possible to compute the distance and the relative velocity from the obtained frequency ranges.

The dependency of the amplitude and phase of the signal received on an antenna element on the azimuth of the located object may be illustrated in an antenna diagram for a standard object at a given distance and having a given reflection intensity. By aligning the amplitudes and/or phases obtained for the same object from different antenna elements with the appropriate antenna diagrams, the azimuth of the object in question may be determined in a second evaluation stage.

SUMMARY OF THE INVENTION

An object of the present invention is to provide a radar sensor having an improved angle detection capacity and at the same time to keep the necessary circuitry complexity within limits.

According to the present invention, this object is achieved by at least two antenna elements connected to the same receive channel together having a directional characteristic having at least two main lobes having different primary sensitivity directions.

Thus, six antenna elements and four receive channels may be provided, for example, two antenna elements being connected to one joint receive channel, two antenna elements being each connected to one innate additional receive channel and the remaining two antenna elements being, in turn, connected to one additional joint receive channel. The antenna elements, which are each connected to a single receive channel, cover, for example, central angle areas, while two antenna elements, which are connected to a joint channel, each have a primary sensitivity direction on the left- and the right-hand sides of the central area. In this way, they may be used both to detect an object in a left-hand area and in a right-hand area. It is therefore possible to cover a larger range of vision using the same number of receive channels, without reducing the angle resolution.

For example, at least two antenna elements, each of which has a directional characteristic having a main lobe having a primary sensitivity direction, may be connected to the same receive channel, so that they have the aforementioned directional characteristic having at least two main lobes having different primary sensitivity directions.

The directional characteristic is, in particular, the receiving directional characteristic of the particular antenna elements. The directional characteristic in principle corresponds to the transmitting directional characteristic with respect to the spatial parameters when one antenna element is used for transmitting and receiving.

The receive channels may, in particular, be channels of an evaluation device of the radar sensor which are each configured to process signals of the corresponding antenna elements.

The at least two main lobes of the directional characteristic of the antenna elements connected to the same receive channel may be separate, i.e., not overlapping, main lobes. This makes it easier to distinguish from which main lobe a received radar signal originates.

Advantageous embodiments and refinements of the present invention are described herein.

At least one other antenna element connected to another channel may have a directional characteristic having at least one main lobe having a primary sensitivity direction which lies between two primary sensitivity directions of the aforementioned at least two main lobes. This makes it possible to obtain additional information regarding angle detection of a radar object. The aforementioned at least one main lobe may overlap the at least one of the aforementioned at least two main lobes.

In one specific embodiment, the radar sensor has a radar lens, in particular a collective lens, situated upstream from the antenna elements. Different primary sensitivity directions of the antenna elements may then be easily achieved with the aid of a different lateral offset of the antenna elements with regard to an optical axis of the radar lens. The sequence in which the primary sensitivity directions of the individual main lobes follow successively in the azimuthal direction may then correspond to the sequence of the antenna elements situated in series.

Thus, the antenna elements may, for example, be situated in series, at least another antenna element connected to another receive channel being situated between the at least two antenna elements connected to the same receive channel. This additional antenna element then has a primary receiving direction which lies between two primary receiving directions of the first-named at least two antenna elements.

The antenna elements may be patch antennas, for example.

"Antenna elements" in the sense of this application are, however, also to be understood to mean antenna columns using which a beam formation in the elevation direction may take place, for example. Such antenna columns run vertically when the radar sensor is installed in the vehicle. The antenna columns are then situated horizontally next to one another. The phase relation and the performance distribution between the different subelements (patches) within an antenna column determine the directional characteristic in the elevation.

The antenna elements may be transmitting and receiving antenna elements.

The antenna elements may be situated outside of a focal plane (image plane) of the radar lens. By placing the antenna elements at a slightly smaller or greater distance from the radar lens, for example, phase deviations of the radar signals, which are pronounced more or less strongly, occur for the individual antenna elements depending on the lateral distance from an optical axis of the radar lens. If, for example, antenna elements connected to the same receive channel are situated on the left and on the right of the optical axis at different distances from the optical axis, different phase relations may result among the received signals of the receive channels for positions of a radar object at the same angle distance on the left or on the right of the optical axis.

The radar sensor may have an evaluation device which is configured to determine an angle position of a detected radar object on the basis of amplitudes and phases of received radar signals of the antenna elements.

The evaluation device may be configured to distinguish between angle positions, assigned to the particular main lobes, of a radar object detected by the aforementioned at least two main lobes on the basis of amplitudes and phases of received radar signals of the antenna elements connected to the same receive channel and on the basis of amplitudes and phases of received radar signals of one or multiple additional antenna element(s) connected to one or multiple additional receive channel(s). For example, the antenna elements may be configured in such away that, in the directional characteristics of the antenna elements, angle positions, which are associated with different main lobes of the antenna elements connected to the same receive channel, are distinguishable based on associated amplitudes and phases and the amplitudes and phases, associated with the angle positions, of one or multiple additional receive channel(s), so that the evaluation device is capable of distinguishing between angle positions, associated with the particular main lobes, of a radar object detected by the aforementioned at least two main lobes.

In one specific embodiment, the evaluation device may be configured to take into account, during the determination of the angle position, a phase difference between received radar signals from receive channels which are connected to the antenna elements which have directional characteristics having overlapping main lobes. By forming the phase difference, phase information from overlapping main lobes may be used particularly well.

At least two primary sensitivity directions of the antenna elements connected to a first receive channel may be nested with at least two primary sensitivity directions of the antenna elements connected to another channel. If the primary sensitivity directions are nested in the azimuthal direction, they are thus situated on the left in a different sequence than on the right, from the inside to the outside in each case. For example, the evaluation device may be configured to distinguish between angle positions of a radar object detected by two main lobes of antenna elements connected to the first receive channel on the basis of a phase difference between received radar signals of the first receive channel and of the aforementioned other receive channel.

In the following, exemplary embodiments are elucidated in greater detail with reference to the drawings.

DETAILED DESCRIPTION

Figure 1:
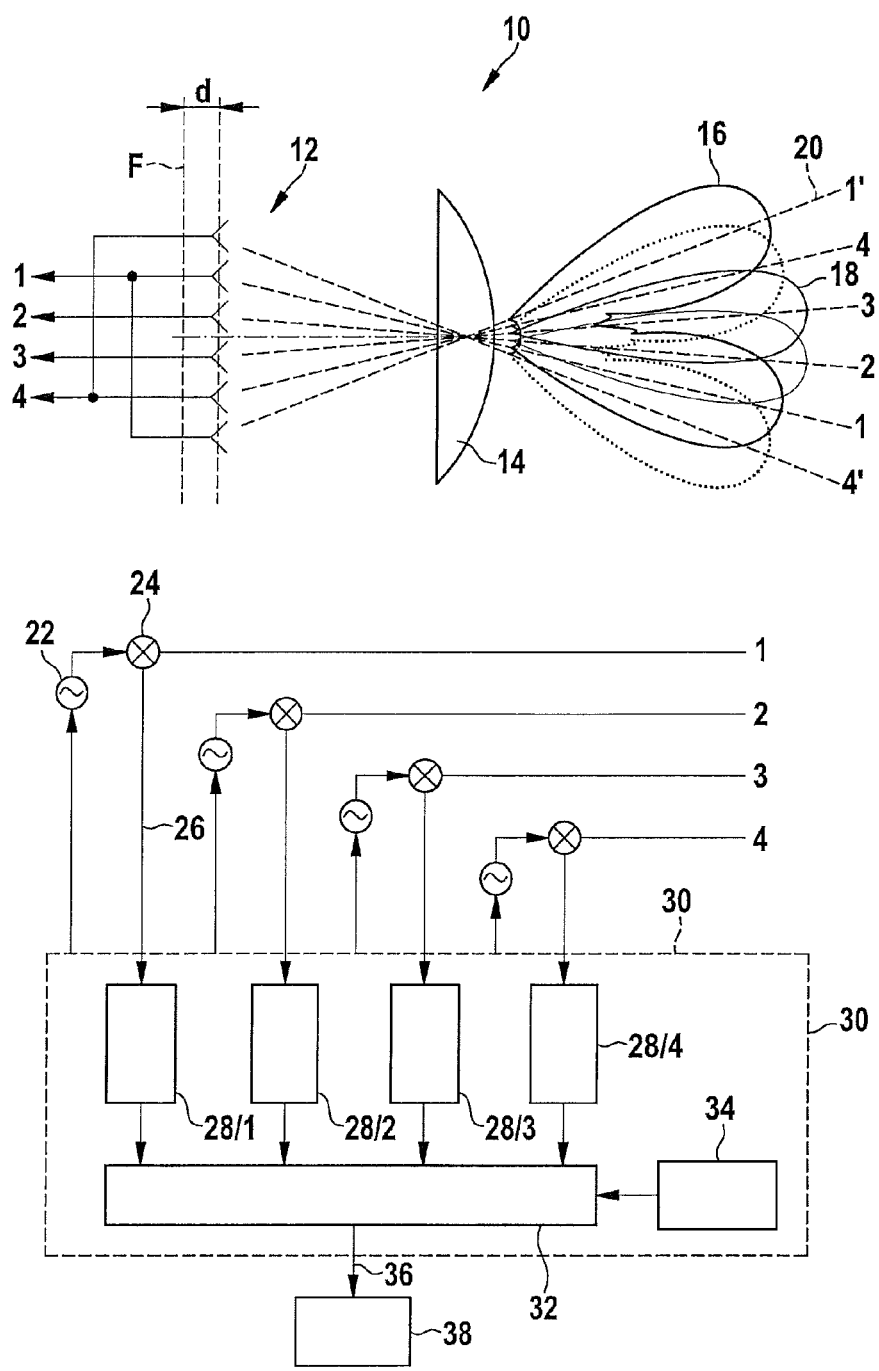
FIG. 1 shows a block diagram of the radar sensor according to the present invention.

The radar sensor shown in FIG. 1 has an antenna system 10 having six antenna elements 12, which may also be referred to as primary radiators, and a radar lens 14, in the form of a cumulative lens, situated at a distance upstream from antenna elements 12. Antenna elements 12 are situated next to one another in series in the horizontal direction. Here, antenna elements 12 are slightly offset with regard to focal plane F (image plane) of radar lens 14. For example, radar lens 14 has a focal length of 28 mm, and antenna elements 12 are situated at a distance d of 3 mm to 4 mm upstream from focal plane F. The optical axis of radar lens 14 is dot-dashed. In the illustrated section plane, it intersects focal plane F in the focal point.

The two outer left-hand antenna elements and the two outer right-hand antenna elements are connected in pairs to joint feed lines 1 and 4, and the central antenna elements are each connected to separate feed lines 2 and 3. Antenna elements 12 are connected to feed lines 4, 1, 2, 3, 4, 1 from left to right. The radar beams generated by antenna elements 12 are identified by 1 through 4 as well as 1' and 4' correspondingly to the associated feed lines 1 through 4 and are represented by corresponding main lobes 16, 18 and primary sensitivity directions 20 (dashed lines).

A radar signal, which is transmitted by the antenna elements in question, is supplied via each of feed lines 1 through 4 to corresponding antenna elements 12 from a local oscillator 22 via a mixer 24. The signal of a radar echo received by the particular antenna elements is mixed in mixer 24 with the transmitted signal so that an intermediate frequency signal 26 is obtained which is supplied to a particular receive channel 28 of an evaluation device 30 of the radar sensor. The signals originating from four feed lines 1 through 4 are each pre-processed in a separate receive channel 28. Receive channels 28/1 through 28/4 are identified in the following as channels 1 through 4.

Antenna elements 12 connected to channel 1 form two main lobes 16 having different primary sensitivity directions 20 which are identified in FIG. 1 by 1 and 1'. Antenna elements 12 connected to channel 4 also form two main lobes 16 having different primary sensitivity directions 20 which are identified by 4 and 4'. In this case, the primary sensitivity directions of radar beams 1' and 1 are nested with the primary sensitivity directions of radar beams 4 and 4'. While outer left-hand main lobe 16 is assigned to channel 1, outer right-hand main lobe 16 is assigned to channel 4. The number of main lobes 16 assigned to a channel corresponds to the number of antenna elements 12 connected to the channel from the directional characteristics from which they result by superimposition.

Main lobes 18 of channels 2 and 3 lie between particular main lobes 16 of channels 1 and 4. Here, only one main lobe 18 is assigned to each of channels 2 and 3, since they are each connected to only one antenna element 12.

The primary sensitivity directions of main lobes 18 of channels 2 and 3, as well as one of main lobes 16 of channel 4, lie between primary sensitivity directions 20 of main lobes 16 assigned to channel 1.

In FIG. 1, main lobes 16 of the beams assigned to channel 1 are highlighted with a thick line, while main lobes 16 assigned to channel 4 are highlighted with dotted lines. Particular main lobes 16 of a channel are separated from one another by local minima. It is possible that side lobes are present between main lobes 16.

According to the operating principle of an FMCM radar, the frequencies of the radar signals generated by oscillators 22 are modulated in a ramp-shaped manner, each cycle containing at least one rising ramp and one falling ramp. During the pre-processing in receive channels 28, the intermediate frequency signals obtained on each ramp are recorded and converted into a frequency spectrum by discrete Fourier transform. The peaks corresponding to the located objects are then identified in this spectrum. Based on the frequency ranges of the peaks obtained for each object on the rising and falling ramp, the distance and the relative velocity of the object in question may then be computed in a known manner. In addition, the peaks are normalized during the pre-processing in receive channels 28 in such a way that their amplitudes may be compared to one another. Likewise, the phases belonging to the peaks are determined.

In a module 32 of evaluation device 30, normalized amplitudes and phases of the peaks of the intermediate frequency signals are then aligned with the appropriate antenna diagrams for antenna elements 12, so that the azimuths of the located objects may be determined with the aid of the known angular dependency of the amplitudes and phases. For example, the phase differences for channels 1-2, 2-3, 3-4, and 4-1 are formed in each case, and the phase differences as well as the amplitudes are correlated with the appropriate antenna diagrams in order to estimate the azimuths of the located objects based on the degree of congruence. For this purpose, an angle spectrum is determined, for example, which indicates a correlation with the values of the amplitude and phase as a function of the angle. A peak of the angle spectrum then identifies the most probable value of the azimuth. Characteristic lines of the antenna diagrams, in particular of the amplitudes and the phase difference, are stored in a memory 34 of evaluation device 30.

Figure 2:
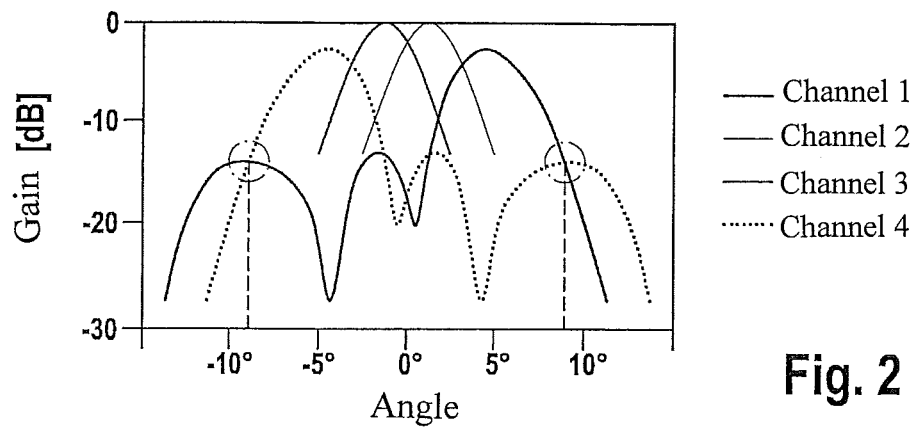
FIG. 2 shows a representation of an antenna diagram.

FIG. 2 schematically shows an example of an antenna diagram of the four channels. The antenna gain (amplitude) is illustrated in dB against the azimuth. The particular antenna characteristic lines of the four channels, as in FIG. 1, are illustrated having differently strong lines (channels 1 through 3) and as a dotted line (channel 4). Adjacent main lobes overlap.

In FIG. 2, two angle positions (at approximately −9° and +9°), at which the amplitudes of channels 1 and 4 are identical, are identified by circles. If, for example, there is a radar object in one such position between primary sensitivity directions 20 of beams 1' and 4, in which signals having the same amplitude are received in channels 1 and 4, the same amplitude ratio of the signals would be obtained in channels 1 and 4 in a position symmetric thereto between primary sensitivity directions 20 of radar beams 1 and 4' on the opposite side.

Figure 3:
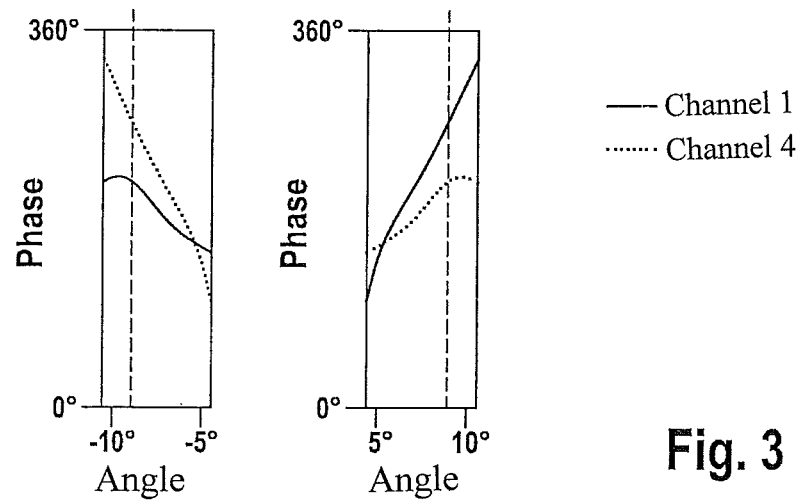
FIG. 3 shows sections of a diagram which shows the angular dependency of the phase of the directional characteristic of two channels.

FIG. 3 sectionally shows an associated illustration of the phase against the azimuth. For the sake of simplification of the illustration, only channels 1 and 4 are shown. The offset of antenna elements 12 with regard to the image plane of radar lens 14 enlarges an angular dependency of the phase of the antenna diagram. Due to the asymmetric configuration of the antenna elements of channels 1 and 4 with regard to the optical axis, i.e., the roles of channels 1 and 4 are interchanged on the left- and the right-hand sides of the optical axis in each case, the directional characteristic of channel 1 is mirror-inverted in relation to the directional characteristic of channel 4 with regard to the angle zero in both the amplitude and the phase. The phase difference is therefore asymmetric with regard to the angle zero.

Figure 4:
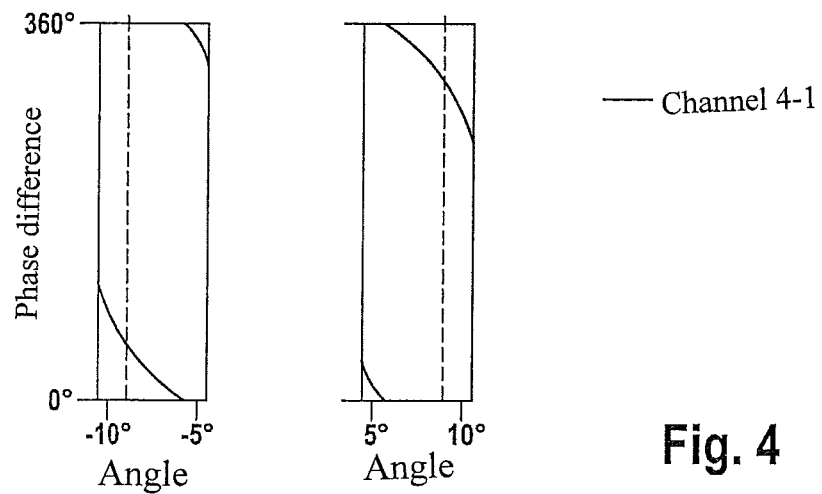
FIG. 4 shows sections of a diagram which shows the angular dependency of the phase difference of the directional characteristic of the channels.

FIG. 4 shows a corresponding illustration of the phase difference of channels 4 and 1. The characteristic line of the phase difference is a function of the angle. The phases of the characteristic line differ in the points of the same amplitude of channels 1 and 4, and the resulting phase difference is approximately 50° at −9°, while it is approximately 310°, i.e., −50°, at +9°. At the angle positions having the same amplitude of channels 1 and 4, the angle positions assigned to the particular main lobes of the same channel are thus distinguishable based on the phase difference. An azimuth of an object may then be unambiguously determined.

In particular, by placing antenna elements 12 outside of focal plane F and by placing antenna elements 12, connected to the same channel 28-1 or 28-4, asymmetrically with regard to the optical axis, angle positions, which are associated with different main lobes 16 of antenna elements 12 connected to the same receive channel, are thus distinguishable in the directional characteristics of the antenna elements based on assigned amplitudes and phases, as well as the amplitudes and phases, associated with the angle positions, of one or multiple additional receive channel(s). This means that in the antenna diagram of the radar sensor, angle positions of received radar signals, which are associated with angle positions of different main lobes 16 of antenna elements 12 connected to the same receive channel, are distinguishable based on amplitudes and phases of the radar signals and the amplitudes and phases of radar signals of one or multiple additional receive channel(s).

The tracking data, i.e., the distances, relative velocities, and azimuths, obtained for each object are made available by the radar sensor via an interface 36. The radar sensor is, for example, connected via interface 36 to an ACC system 38 which then controls the velocity of the vehicle equipped with the radar sensor based on the positioning data.

Individual receive channels 28 may be used multiple times for object detection in different directions in the case of parallel signal reception of all antenna elements 12. This is possible, since in each case two antenna elements 12, which are not directly adjacent, are connected to the same channel 28 for evaluation. This makes it possible to use phase difference information regarding one or multiple intermediate antenna element (s) 12. The number of antenna elements 12 is larger than the number of channels 28. A simplified circuitry results, since antenna elements 12 connected to the same channel 28 are directly connected to one another.

As a deviation from the described example, antenna elements 12 may, however, also be connected to a separate mixer 24, and the corresponding intermediate frequency signals may be interconnected to assigned channels 1 and 4.

Phase information for distinguishing from which main lobe 16 of channel 1 a radar signal originated may also be achieved by overlapping with radar lobes 18 from one of channels 2 or 3.

Any kind of ambiguity between a left-hand and a right-hand position of a located radar object may, for example, also be resolved by tracking the radar objects. Module 32 of evaluation device 30 may, for example, be configured to determine the positioning data for an object also on the basis of earlier positioning data of an object.

Furthermore, there may be applications in which it is not necessary to distinguish between positions on the far left and the far right in the case of radar objects located outside of the travel path.

By switching antenna elements 12 together, as described above, with different primary sensitivity directions 20 which are spaced apart, an angle resolution, which approximately corresponds to six individual beams, may be achieved using only four receive channels 28. In contrast to what would be the case with a pure widening of individual beams, the angle resolution is not made worse, although it is possible to scan a wider range of vision. According to the larger number of main lobes 16, 18 made available, the individual beams may be focused more strongly in the case of the radar sensor according to the present invention, so that main lobes 16, 18 may have a thinner shape than in the case of a conventional radar sensor. This may be achieved by suitably dimensioning and placing the antenna elements (patches) and radar lens 14. The stronger focusing of the beams has the advantage that, on the one hand, a larger angle resolution capacity may be achieved, while, on the other hand, the angle range covered overall may be greater than that known from the related art.

Figure 5:
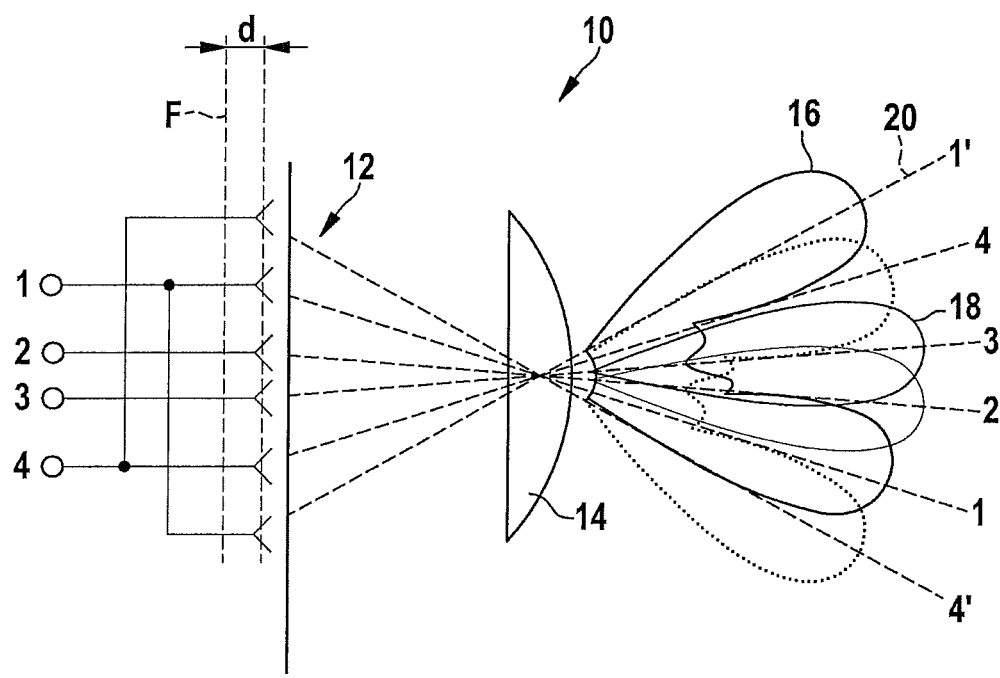
FIG. 5 shows a drawing of another example of an antenna system of the radar sensor.

FIG. 5 shows one variant of the antenna system of the radar sensor in which outer antenna elements 12 have a greater distance from one another than inner antenna elements 12. For this reason, the angular distance between adjacent outer primary sensitivity directions 20 of radar beams 1', 4, and 3 is greater than an angular distance between the adjacent inner primary sensitivity directions of radar beams 3 and 2. On the other side, the angular distance between adjacent outer primary sensitivity directions 20 of radar beams 4', 1, and 2 is also greater than the angular distance between the inner primary sensitivity directions of radar beams 2 and 3. For this reason, a high angular accuracy may be achieved in the central angle range about 0°, and at the same time, a wide tracking range is obtained in the outer range of vision.

It is understood that the configurations illustrated in FIGS. 1 and 2 are only to be understood as examples and that the number of antenna elements 12 and of receive channels 28 available overall, as well as the configuration of the beams, may vary depending on the specific embodiment.

In the above-described example, evaluation device 30 has four channels 28. It is, however, also possible for more than two main lobes 16 to be provided per receive channel 28 by connecting three or more antenna elements 12 to one receive channel, for example. As a deviation from the described, symmetric configuration, an asymmetric configuration of individual main lobes 16, 18 and/or of the assignment of the main lobes to the receive channels may take place. For example, it is thus possible that on the one side, antenna elements are combined and connected to one joint channel, while on the other side of the series of antenna elements, the antenna elements are each connected individually to a separate channel.

The distances between individual antenna elements 12 may also vary. The distances between antenna elements 12 are not limited to the described, symmetric configurations.

While the described examples each represent a monostatic antenna system in which the same antenna elements 12 are used in the same interconnection to the individual channels for transmitting and receiving, bistatic specific embodiments are also conceivable in which the antenna elements used for reception are connected to the receive channels in a corresponding manner. The antenna system may, for example, correspond to the antenna system shown in FIG. 1 or 2 with regard to the circuitry of the antenna elements and the configuration of main lobes 16, 18 and primary sensitivity directions 20.

What is claimed is:

1. An angle-resolving radar sensor for a motor vehicle, comprising:
   multiple antenna elements; and
   multiple receive channels;
   wherein at least two of the antenna elements are connected to a same one of the receive channels and together have a directional characteristic having at least two main lobes having different primary sensitivity directions, and
   wherein the antenna elements are configured so that, in the directional characteristics of the antenna elements, angle positions, which are associated with different main lobes of the antenna elements connected to the same receive channel, are distinguishable based on associated amplitudes and phases and the amplitudes and phases, associated with the angle positions, of at least one additional receive channel.

2. The radar sensor of claim 1, wherein at least one other antenna element is connected to another of the receive channels and has a directional characteristic having at least one main lobe having a primary sensitivity direction which lies between two primary sensitivity directions of the at least two main lobes.

3. The radar sensor of claim 1, wherein the antenna elements connected to the same channel are directly connected to one another.

4. The radar sensor of claim 1, wherein the radar sensor has a radar lens situated upstream from the antenna elements.

5. The radar sensor of claim 4, wherein the antenna elements are situated outside of a focal plane of the radar lens.

6. The radar sensor of claim 1, wherein the antenna elements are situated in series, at least one other antenna element connected to another receive channel being situated between the at least two antenna elements connected to the same receive channel.

7. The radar sensor of claim 1, further comprising:
an evaluation device to determine an angle position of a detected radar object based on amplitudes and phases of received radar signals of the antenna elements, wherein the evaluation device is configured to distinguish between angle positions, assigned to the particular main lobes, of a radar object detected by the aforementioned at least two main lobes based on amplitudes and phases of received radar signals of the antenna elements connected to the same receive channel and based on amplitudes and phases of received radar signals of at least one additional antenna element connected to at least one additional receive channel.

8. The radar sensor of claim 1, wherein at least two primary sensitivity directions of the antenna elements connected to a first one of the receive channels are nested with at least two primary sensitivity directions of the antenna elements connected to another one of the channels.

9. The radar sensor of claim 1, wherein an optical axis of the radar sensor lies between two primary sensitivity directions of the main lobes of the at least two antenna elements connected to the same receive channel.

10. An angle-resolving radar sensor for a motor vehicle, comprising:
multiple antenna elements; and
multiple receive channels, wherein at least two of the antenna elements are connected to a same one of the receive channels and together have a directional characteristic having at least two main lobes having different primary sensitivity directions; and
an evaluation device to determine an angle position of a detected radar object based on amplitudes and phases of received radar signals of the antenna elements, wherein the evaluation device is configured to take into account, during the determination of the angle position, a phase difference between received radar signals from receive channels which are connected to the antenna elements which have directional characteristics having overlapping main lobes.

11. An angle-resolving radar sensor for a motor vehicle, comprising:
multiple antenna elements; and
multiple receive channels;
wherein at least two of the antenna elements are connected to a same one of the receive channels and together have a directional characteristic having at least two main lobes having different primary sensitivity directions; and
wherein the antenna elements have different particular primary sensitivity directions, the angular distance between the adjacent outer primary sensitivity directions being greater than an angular distance between the adjacent inner primary sensitivity directions.

* * * * *